United States Patent Office 3,316,678
Patented May 2, 1967

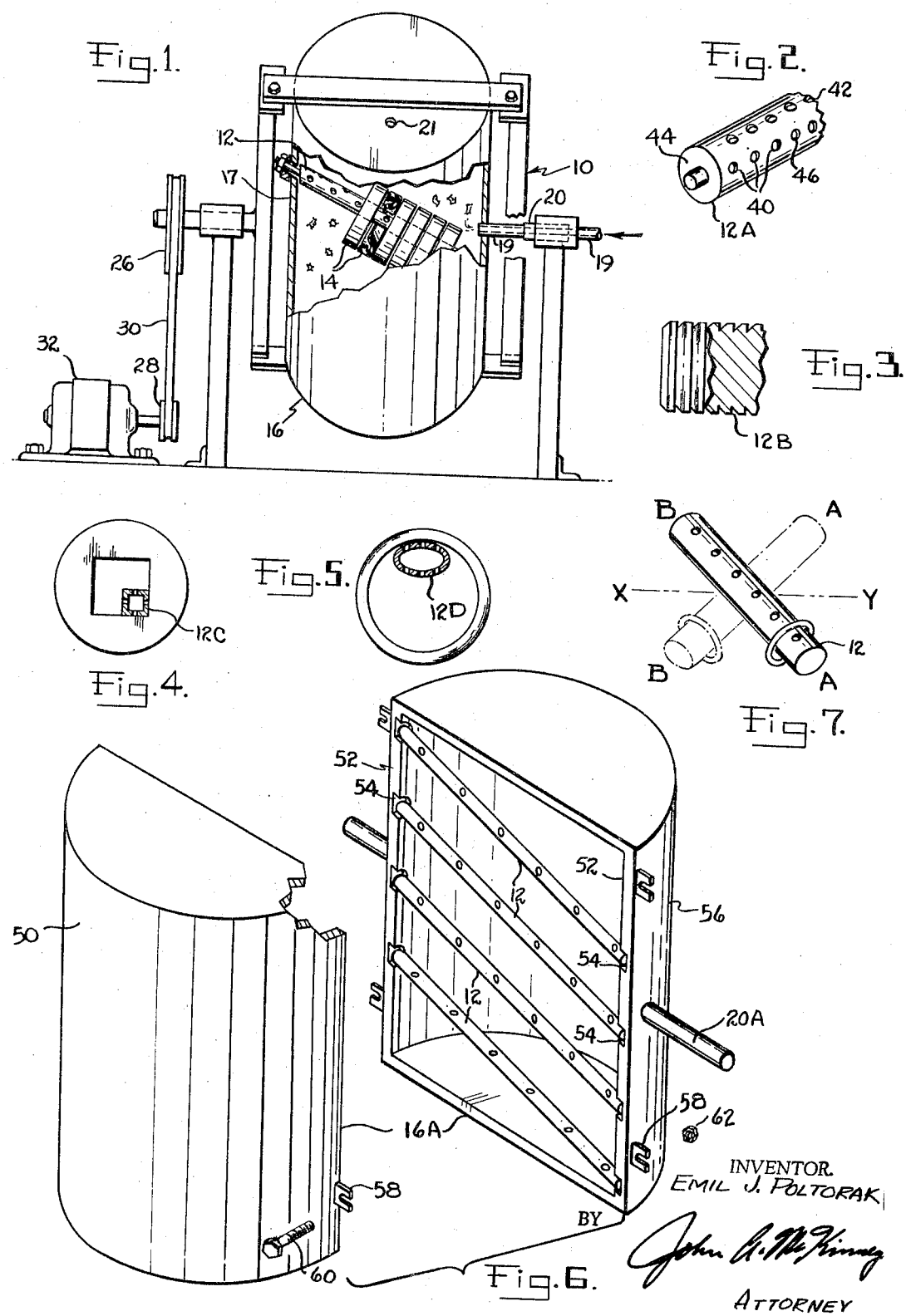

3,316,678
APPARATUS FOR ABRADING APERTURED ARTICLES
Emil Jacob Poltorak, Somerville, N.J., assignor to Johns-Manville Corporation, New York, N.Y., a corporation of New York
Filed Dec. 9, 1964, Ser. No. 417,098
13 Claims. (Cl. 51—5)

This invention relates generally to apparatus for abrading and more particularly to abrading apparatus of the type usually employed in conjunction with the removal of flash from molded products.

This invention is directed to apparatus for simultaneously abrading a plurality of apertured molded articles supported on a mandrel and is primarily directed to an improved support mandrel which facilitates the removal of flashing from the inner peripheral surfaces of apertured articles.

One of the problems that has faced the manufacturers of molded seals for dynamic service is that of removing the flashing from the inner peripheral surface of the molded seal. The problem is mainly one of removing the flashing without destroying or affecting the dimensions of the molded part. Any disturbance of the dimension of the molded seal will manifest itself, when the seal is installed on a shaft and put into service, in the form of a leak.

Some of the current methods of removing flashing from molded sealing elements comprise removing the flashing with cutting tools such as knives or scissors and subsequently grinding the surface to the desired finish. Such methods are time consuming and very costly. Furthermore, the quality is mainly contingent upon the ability and experience of the workman.

Having in mind the defects of the prior art, it is an object of this invention to provide apparatus for removing flashing in a more simple and facile manner.

Another object of this invention is to provide apparatus for simultaneously and accurately removing the flashing from a plurality of molded articles.

Toward the attainment of the foregoing objects, the invention contemplates a supporting mandrel for supporting a plurality of apertured articles, said mandrel having outside dimensions sufficiently smaller than the dimensions of the aperture of said articles so that the articles are free to move along said mandrel in an axial direction. The mandrel also defines abrading means, which may be in the form of sharp edges defined by the edge openings in the mandrel. Alternatively, the abrading means may be in the form of serrations. The mandrel is preferably mounted so that its axial extent is on an incline. Means are provided for imparting motion to the mandrel in a manner whereby the apertured articles may alternately and successively slide back and forth along said mandrel and also move in a direction traverse to the axial extent of the mandrel. Since the apparatus of this invention is particularly adapted for removing the flashing from molded elements, which elements are usually of elastomer material, means are also provided, in a preferred embodiment of the invention, for cooling the articles or sealing elements sot hat the elastomer elements will become more rigid and more susceptible to abrasion by the sharp edges or serrations of the mandrel as they slide therealong. The coolant may be introduced into an enclosure which may take the form of a tumbling barrel. The apparatus may further comprise abrading particles within the enclosure, which particles are adapted to be tossed about and abrade any flash appearing on the outer surfaces of the apertured molded articles.

The invention will be more fully understood and further objects and advantages thereof will become apparent when reference is made to the following detailed description and to the accompanying drawing in which:

FIG. 1 is a front elevational view of a preferred embodiment of the apparatus of this invention;

FIG. 2 is a fragmentary pictorial view of a preferred embodiment of the mounting mandrel of this invention;

FIG. 3 is an elevational view, partially in section, of an alternate embodiment of mounting mandrel;

FIG. 4 is a cross-sectional end view of a mandrel having a square cross-sectional configuration;

FIG. 5 is a cross-sectional end view of a mandrel having an oval cross-sectional configuration;

FIG. 6 is a pictorial view of a tumbling barrel embodying the principles of this invention and wherein a plurality of support mandrels are employed; and FIG. 7 is a schematic representation of alternate positions of the oscillating support mandrel.

Referring to FIG. 1, there is shown an abrading apparatus, generally designated by the numeral 10. The abrading apparatus 10 as there shown incorporates these principal elements: a mandrel 12 for mounting a plurality of apertured articles 14, shown to be in the form of molded sealing rings; a rotatable enclosure 16, shown to be in the form of a tumbling barrel, the side wall of said enclosure 16 forming means for supporting the mandrel 12; and means for rotating and supporting the enclosure 16, which means is shown to comprise a frame 18 mounted on shaft 20, supported in journals 22 and 24, and rotatably driven by motor 32 through pulleys 26 and 28 and belt 30.

The mandrel as illustrated in FIG. 2 is in the form of a cylinder and generally designated by the numeral 12A (each of the embodiments of the mandrels illustrated in this specification are designated by the numeral 12 but with a different letter suffix). The mandrel 12A defines a plurality of recesses 40 shown to be in the form of apertures extending through the wall 42 of the cylinder 44. It is to understood that the term recesses as employed in the specification and the appended claims is intended to cover cavities which extend part way through the wall or throughout the wall so as to form an aperture or opening. The primary function of the recesses is to define sharp edges 46 for abrading the apertured articles 14 during the abrading process. The secondary function of the recesses is to reduce the surface area of the mandrel and thus deter the tendency of the mandrel to function as a "heat sink."

The mandrel 12 may have other cross-sectional configurations such as, by way of illustration but not necessarily limitation, the forms as illustrated in FIGS. 3, 4 and 5. Generally, it is preferred that the cross-sectional configuration of the mandrel correspond to the cross-sectional configuration of the aperture of the articles to be abraded. The only requirement is that the cross-sectional dimensions of the mandrel be sufficiently smaller than the cross-sectional dimensions of the apertures of the articles 14 so that the apertured articles 14 are free to slide back and forth along the axial extent of the mandrel and may also move in a direction transverse to the axial extent of the mandrel so as to present a new peripheral surface into contact with the mandrel as the mandrel is oscillated.

In some instances there may be an advantage to forming the mandrel with an oval cross-sectional configuration for use with apertured articles having circular apertures in order to present more surface contact and thus increase the abrading possibilities such as illustrated in FIG. 5.

The mandrel 12 is preferably supported for movement about an axis which is not coaxial with the axial extent of the mandrel whereby an oscillating or rocking motion is imparted to the mandrel and thereby facilitates sliding movement of the apertured articles 14 both along the axial extent of a mandrel and in a direction transverse to the axial extent of the mandrel. The oscillating motion of the mandrel is diagrammatically illustrated in FIG. 7. During one part of the cycle (shown in full lines) the end A of mandrel 12 is in what may be termed a bottom position whereas the end B of the mandrel is in what may be termed a top position. Then after a 180° rotation (shown in phantom lines) of the mandrel 12 about an axis X–Y the end B of the mandrel comes into the bottom position and the end A of the mandrel is rotated to the top position. During this rotation, an apertured article 14 slides from end A down toward end B and at the same time rotates about the axis of the mandrel 12.

The mandrel 12 is shown in FIG. 1 to be cantileverly supported by side wall 17 of enclosure 16. However, it will be apparent that the mandrel 12 may also be supported directly to the frame 18, or to other suitable support means, without departing from the spirit of the invention. It will also be apparent that the mandrel 12 may be supported entirely within the enclosure 16 in a manner such as illustrated in FIG. 6.

When processing apertured articles which are normally resilient and which resist abrasion, it is desirable to provide an enclosure about the mandrel 12 to facilitate cooling the apertured articles sufficiently so that they become brittle and more susceptible to abrading. The cooling agent may be introduced into the enclosure 16 by any suitable means, such through coolant supply pipe 19. Another satisfactory method for cooling elastomer articles is through the provision of Dry Ice particles within the enclosure 16. In such case a vent 21 is provided to relieve any pressure which might build up within the enclosure 16. A further advantage which accrues from the use of Dry Ice is that the particles also serve as abrading means for abrading the outside peripheral surfaces of the apertured articles. Otherwise, when it is deemed necessary to remove flashing or other appendages from the outside peripheral surfaces of the articles, other abrading particles such as wooden blocks or the like must be provided.

The following data is presented in order to provide a full and complete disclosure of apparatus and method that have been tried and proved successful. A plurality of sealing rings molded from Buna N type rubber, having a durometer hardness in the general order of 75 (Shore A scale) and having an internal diameter of 3 inches were mounted on a mandrel of the type shown in FIG. 2 and having an outside diameter of 1¾ inches. The mandrel was mounted at an angle of approximately 45° in an enclosure of the type shown in FIG. 1. Dry Ice particles sufficient to reduce the temperature within the enclosure to approximately minus 20° F. were added and the enclosure was tumbled with the mandrel and apertured articles therein for approximately 2 hours. The flashing from the molded articles was completely removed and did not require any further machining or finishing.

In FIG. 6 is illustrated an arrangement wherein a plurality of mandrels 12 may be inserted in a single enclosure 16A. To facilitate loading and unloading of the mandrels, the enclosure 16A is split along the longitudinal extent thereof. The removable cover 50 may also be provided with flange portions 52 which define recesses 54 and means to secure the mandrels 12 in place. The cover 50 and the main body 56 of enclosure 16A may be suitably secured together with means such as members 58, bolts 60, and nuts 62. FIG. 6 also illustrates the manner in which the enclosure 16A may be directly secured to the rotatable shaft 20A instead to an intermediate frame 18. Also, the shaft 20A may be hollow to function as means to emit a coolant into the interior of enclosure 16A.

Some of the advantages arising from the present method and apparatus are that in a single operation a plurality of apertured articles may be simultaneously abraded to remove any undesirable appendages, such as flashing without the need of expensive equipment and in much less time than required in previous operations. Further, an attendant operator may load an enclosure with one or more mandrels with apertured articles to be abraded while another batch of apertured articles are being abraded. Still further, method and apparatus are provided for accurately removing flashing from molded articles in a manner which is not contingent upon the ability and experience of the workmen.

What I claim:
1. Apparatus for abrading apertured articles, comprising:
    (a) a mandrel adapted to mount a plurality of said apertured articles in a manner whereby said articles are free to move in an axial direction along said mandrel;
    (b) said mandrel defining a series of sharp edges for abrading the inner peripheral area of said articles as they move along said mandrel;
    (c) means for imparting a rocking motion to said mandrel in a manner whereby the area of contact between said mandrel and each of said articles is continually changed during the rocking motion.
2. Apparatus as described in claim 1, wherein said mandrel is in the form of a cylinder.
3. Apparatus as described in claim 1, wherein said mandrel has a polygonal cross-sectional configuration.
4. Apparatus as described in claim 1, wherein said mandrel has an oval cross-sectional configuration.
5. Apparatus as described in claim 1, wherein said sharp edges of said mandrel are defined by a series of recessed portions of said mandrel.
6. Apparatus as described in claim 1, wherein said sharp edges of said mandrel are defined by a plurality of serrations.
7. Apparatus as described in claim 1 which further comprises an enclosure enclosing at least a portion of said mandrel on which said apertured articles are adapted to be mounted; and means for cooling the interior of said enclosure and said articles.
8. Apparatus as described in claim 7 which further comprises abrading particles within said enclosure, and means for tumbling said enclosure with said articles and said abrading particles therein, said particles being adapted to abrade the outer peripheral surface of said articles as said enclosure is tumbled.
9. Apparatus as described in claim 7 wherein said means for cooling the interior of said enclosure is in the form of Dry Ice particles.
10. Abrading apparatus for removing flashing from molded annuluses, comprising:
    (a) a mandrel for mounting a plurality of said annuluses, said mandrel having an outside diameter sufficiently smaller than the internal diameter of said annuluses so that said annuluses are free to move along said mandrel in an axial direction and in a direction transverse to the axis of said mandrel;
    (b) said mandrel defining abrading means for abrading the inner circumferential surface of said annuluses as they move along said mandrel;
    (c) mounting means mounting said mandrel; and
    (d) means for imparting rocking motion to said mandrel in a manner whereby said annuluses may alternatively and successively slide back and forth along said mandrel and also may rotate about said mandrel.
11. Apparatus for abrading apertured articles, comprising:
    (a) a plurality of mandrels, each adapted to mount a plurality of articles in a manner whereby said articles are free to move in an axial direction along their respectively mounted mandrels;
    (b) each of said mandrels having abrading means for abrading the inner peripheral area of the articles as they move along the mandrels; and (c) common means for simultaneously imparting a rocking motion to each of said mandrels.

12. Apparatus as described in claim 11, which further comprises:

enclosure means commonly enclosing said mandrels.

13. Apparatus as described in claim 12, wherein:

said enclosure means is split along a longititudinal extent thereof and includes a removable cover which cover defines means for securing said mandrel in place.

References Cited by the Examiner

UNITED STATES PATENTS

| 691,802 | 1/1902 | Patton. | |
|---|---|---|---|
| 922,415 | 5/1909 | Glasel. | |
| 2,224,545 | 12/1940 | Lash | 79—1 |
| 2,497,076 | 2/1950 | Ferguson | 51—290 X |
| 2,909,007 | 10/1959 | Tettke | 51—58 |

HAROLD D. WHITEHEAD, *Primary Examiner.*